US011227617B2

(12) United States Patent
Dusan et al.

(10) Patent No.: US 11,227,617 B2
(45) Date of Patent: Jan. 18, 2022

(54) NOISE-DEPENDENT AUDIO SIGNAL SELECTION SYSTEM

(71) Applicant: Apple Inc., Cupertino, CA (US)

(72) Inventors: Sorin V. Dusan, San Jose, CA (US);
Sungyub D. Yoo, Dublin, CA (US);
Dubravko Biruski, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 16/563,624

(22) Filed: Sep. 6, 2019

(65) Prior Publication Data

US 2021/0074309 A1    Mar. 11, 2021

(51) Int. Cl.
*G10L 21/0208*     (2013.01)
*G10L 15/08*       (2006.01)
*G10L 21/0216*     (2013.01)

(52) U.S. Cl.
CPC .......... *G10L 21/0208* (2013.01); *G10L 15/08* (2013.01); *G10L 2015/088* (2013.01); *G10L 2021/02165* (2013.01)

(58) Field of Classification Search
USPC ................................. 704/231–257, 270–275
See application file for complete search history.

(56) References Cited

U.S. PATENT DOCUMENTS

| 9,747,900 | B2* | 8/2017 | Zurek | G10L 21/0208 |
|---|---|---|---|---|
| 2015/0213811 | A1* | 7/2015 | Elko | G10K 11/16 381/92 |
| 2015/0249892 | A1* | 9/2015 | Kuhnel | H04R 25/552 381/315 |
| 2016/0165361 | A1* | 6/2016 | Miller | H04R 25/48 381/317 |
| 2017/0243577 | A1* | 8/2017 | Wingate | G10L 15/20 |
| 2017/0365249 | A1* | 12/2017 | Dusan | G10L 25/78 |
| 2018/0268837 | A1* | 9/2018 | Ganeshkumar | G10L 21/0216 |

* cited by examiner

*Primary Examiner* — Jesse S Pullias
(74) *Attorney, Agent, or Firm* — Morgan, Lewis & Bockius LLP

(57) ABSTRACT

A device implementing an automatic speech recognition triggering system includes at least one processor configured to receive first and second audio signals respectively corresponding to first and second microphones of a device. The at least one processor is further configured to generate, based on at least one of the first or second audio signals, a third audio signal corresponding to a voice beam directed to an expected position of a mouth of a user. The at least one processor is further configured to determine whether wind noise is present in at least one of the first, second, or third audio signals. The at least one processor is further configured to, based on determining whether wind noise is present, an audio signal from among the second or third audio signals, for a determination of whether at least one of the first or second audio signals corresponds to the user.

20 Claims, 9 Drawing Sheets

NOISE-DEPENDENT AUDIO SIGNAL SELECTION SYSTEM

TECHNICAL FIELD

The present description relates generally to automatic speech recognition (ASR), including triggering an ASR system.

BACKGROUND

Electronic devices may implement voice assistants, which may use ASR to identify words spoken by a user. The voice assistants may perform certain functions (e.g., operating system functions, application functions) based on the identified words.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
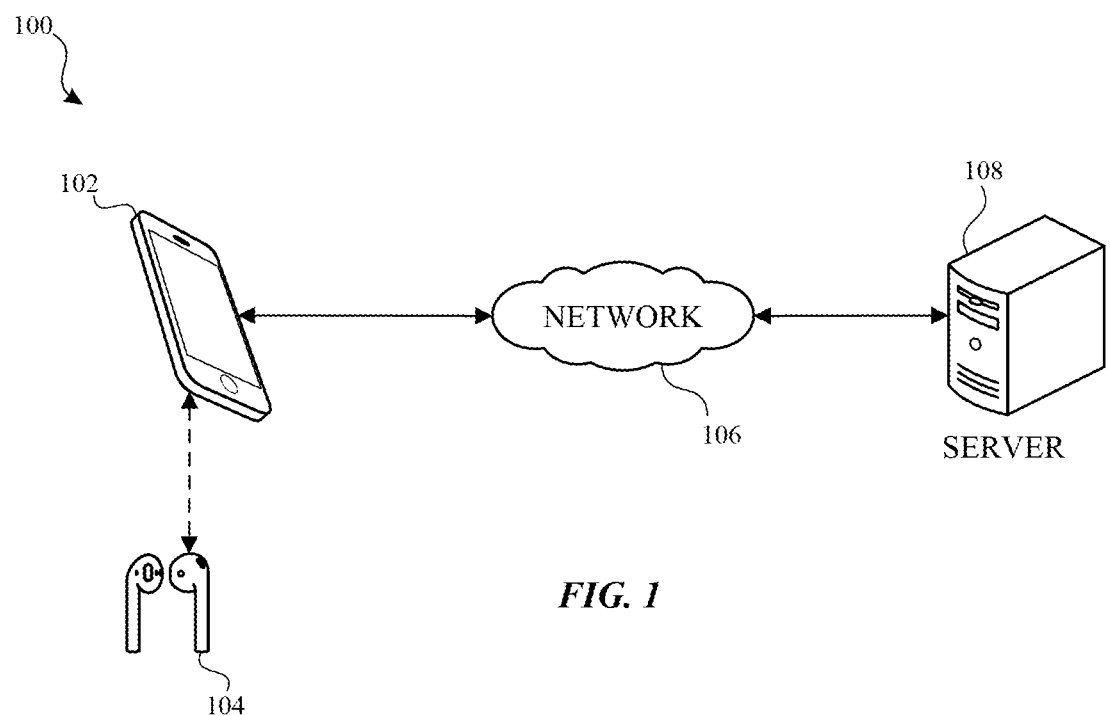
FIG. 1 illustrates an example network environment for providing an automatic speech recognition (ASR) triggering system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices may implement voice assistants, which may use automatic speech recognition (ASR) to identify words spoken by a user. The voice assistants may perform certain functions (e.g., operating system functions, application functions) based on the identified words.

An ASR system of a voice assistant may be triggered by a trigger signal generated by processor (e.g., a specialized processor such as an Always On Processor (AOP)). For example, the trigger signal may be generated in response to user touch input (e.g., detecting a selection of a button and/or a gesture). Alternatively or in addition, the processor may recognize a key-phrase (e.g., "Hi Device" or <Device Name>) in audio signal(s) from a microphone and generate the trigger signal. The processor may provide the trigger signal in order to activate the ASR system of the voice assistant (e.g., to identify spoken words corresponding to voice commands).

However, trigger signals generated based on verbal input and/or touch input may not function properly in noisy environments and/or may be subject to false triggers, where a false trigger corresponds to input other than that provided by the user of the device. For example, a key-phrase spoken by a bystander may falsely trigger (e.g., generate a false trigger signal) the ASR system. In another example, parts of phrases spoken quickly by a user may not be timely captured for key-phrase detection. In yet another example, ambient noise and/or wind noise can alter the accuracy of a key-phrase detector.

In the subject system, audio signals received from multiple microphones are utilized for determining whether to trigger an ASR system. The microphones may be disposed at various locations on an audio input/output device (e.g., a headset, headphones, or earbuds configured to be worn by a user). The subject system may utilize the audio signals received from the multiple microphones to determine a likelihood that a detected key-phrase was spoken by the user wearing the audio input/output device. For example, the positions of the microphones relative to an expected position of the mouth of the user wearing the audio input/output device may be used in conjunction with the received audio signals to determine a likelihood that a detected key-phrase was spoken by the user wearing the audio input/output device. In this manner, the subject system can mitigate the triggering of the ASR system as a result of a key-phrase spoken by a user other than the user wearing the audio input/output device.

The subject system may also determine which audio signal to provide to the key-phrase detector based on one or more environmental factors, such as whether wind is detected in the received audio signals, whether audio is concurrently being output by the audio input/output device, and the like. For example, when wind is detected, the audio signal received from a microphone that is configured and/or positioned for relative protection from the wind may be provided to the key-phrase detector. The inclusion of different types of microphones at different positions on the audio input/output device allows for particular microphones to be relatively protected from wind/ambient noise and/or audio being concurrently output. In this manner, the subject system can provide the key-phrase detector with an audio signal that is substantially free of wind/ambient noise and/or other noise, thereby improving the accuracy of the keyphrase detector.

FIG. 1 illustrates an example network environment for providing an ASR triggering system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, wireless audio input/output device 104, a network 106, and a server 108. The network 106 may communicatively (directly or indirectly) couple, for example, the electronic device 102 and/or the server 108. In FIG. 1, the wireless audio input/output device 104 is illustrated as not being directly coupled to the network 106; however, in one or more implementations, the wireless audio the wireless audio input/output device 104 may be directly coupled to the network 106.

The network 106 may be an interconnected network of devices that may include, or may be communicatively coupled to, the Internet. In one or more implementations, connections over the network 106 may be referred to as wide area network connections, while connections between the electronic device 102 and the wireless audio the wireless audio input/output device 104 may be referred to as peer-to-peer connections. For explanatory purposes, the network environment 100 is illustrated in FIG. 1 as including a single electronic device 102, a single wireless audio the wireless audio input/output device 104, and a single server 108; however, the network environment 100 may include any number of electronic devices, wireless audio input/output device 104 and/or servers.

The server 108 may be, and/or may include all or part of the electronic system discussed below with respect to FIG. 9. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers.

The electronic device 102 may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 9.

The wireless audio input/output device 104 may be, for example, a wireless headset device, wireless headphones, one or more wireless earbuds (or any in-ear, against the ear or over-the-ear device), a smart speaker, or generally any device that includes audio input circuitry (e.g., a microphone) and/or one or more wireless interfaces, such as near-field communication (NFC) radios, WLAN radios, Bluetooth radios, Zigbee radios, and/or other wireless radios. In FIG. 1, by way of example, the wireless audio input/output device 104 is depicted as a set of wireless earbuds. As is discussed further below, the wireless audio input/output device 104 may include one or more microphones that can be used and/or repurposed to trigger automatic speech recognition (e.g., a voice assistant). The wireless audio input/output device 104 may be, and/or may include all or part of, the wireless audio input/output device discussed below with respect to FIG. 2, and/or the electronic system discussed below with respect to FIG. 9.

In one or more implementations, wireless audio input/output device 104 may be paired, such as via Bluetooth, with the electronic device 102. After the two devices 102 and 104 are paired together, the devices 102 and 104 may automatically form a secure peer-to-peer connection when located proximate to one another, such as within Bluetooth communication range of one another. The electronic device 102 may stream audio, such as music, phone calls, and the like, to the wireless audio input/output device 104. Such streaming may correspond to an active audio downlink as described herein. For explanatory purposes, the subject technology is described herein with respect to the wireless audio input/output device 104. However, the subject technology can also be applied to wired audio input/output devices.

Figure 2:
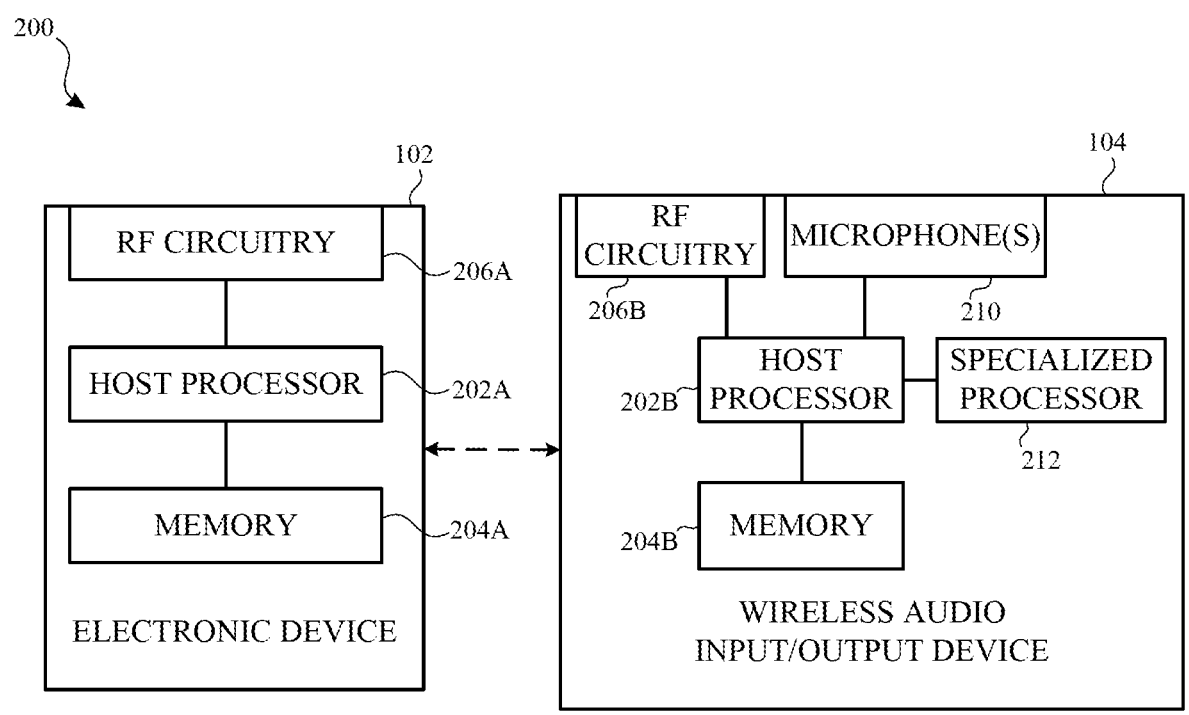
FIG. 2 illustrates an example network environment including an example electronic device and an example wireless audio input/output device in accordance with one or more implementations.

FIG. 2 illustrates an example network environment 200 including an example electronic device 102 and an example wireless audio input/output device 104 in accordance with one or more implementations. The electronic device 102 is depicted in FIG. 2 for explanatory purposes; however, one or more of the components of the electronic device 102 may also be implemented by other electronic device(s). Similarly, the wireless audio input/output device 104 is depicted in FIG. 2 for explanatory purposes; however, one or more of the components of the wireless audio input/output device 104 may also be implemented by other device(s). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202A, a memory 204A, and radio frequency (RF) circuitry 206A. The wireless audio input/output device 104 may include one or more processors, such as a host processor 202B and/or a specialized processor 212. The wireless audio input/output device 104 may further include a memory 204B, RF circuitry 206B and/or one or more microphone(s) 210. While the network environment 200 illustrates microphone(s) 210, it is possible for other types of a sound sensor(s) to be used instead of, or addition to, microphone (s).

The RF circuitries 206A-B may include one or more antennas and one or more transceivers for transmitting/receiving RF communications, such as WiFi, Bluetooth, cellular, and the like. In one or more implementations, the RF circuitry 206A of the electronic device 102 may include circuitry for forming wide area network connections and peer-to-peer connections, such as WiFi, Bluetooth, and/or cellular circuitry, while the RF circuitry 206B of the wireless audio input/output device 104 may include Bluetooth, WiFi, and/or other circuitry for forming peer-to-peer connections.

The host processors 202A-B may include suitable logic, circuitry, and/or code that enable processing data and/or controlling operations of the electronic device 102 and the wireless audio input/output device 104, respectively. In this regard, the host processors 202A-B may be enabled to provide control signals to various other components of the electronic device 102 and the wireless audio input/output device 104, respectively. Additionally, the host processors 202A-B may enable implementation of an operating system or may otherwise execute code to manage operations of the electronic device 102 and the wireless audio input/output device 104, respectively. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

As discussed herein, a given electronic device, such as the wireless audio input/output device 104, may include a specialized processor (e.g., the specialized processor 212) that may be always powered on and/or in an active mode, e.g., even when a host/application processor (e.g., the host processor 202B) of the device is in a low power mode or in an instance where such an electronic device does not include a host/application processor (e.g., a CPU and/or GPU). Such a specialized processor may be a low computing power processor that is engineered to also utilize less energy than the CPU or GPU, and also is designed, in an example, to be running continuously on the electronic device in order to collect audio and/or sensor data. In an example, such a specialized processor can be an always on processor (AOP), which may be a small and/or low power auxiliary processor. In one or more implementations, the specialized processor 212 can be a digital signal processor (DSP).

The specialized processor 212 may be implemented as specialized, custom, and/or dedicated hardware, such as a low-power processor that may be always powered on (e.g., to detect audio triggers with respect to audio signals provided by the microphone(s) 210, and/or to collect and process sensor data from other sensors, such as accelerometers), and may continuously run on the wireless audio input/output device 104. The specialized processor 212 may be utilized to perform certain operations in a more computationally and/or power efficient manner. In an example, the specialized processor 212 may implement an ASR triggering system, as discussed below with respect to FIGS. 3-5. In one or more implementations, the wireless audio input/output device 104 may only include the specialized processor 212 (e.g., exclusive of the host processor 202B).

The microphone(s) 210 may include one or more external microphones, one or more internal microphones, or a combination of external microphone(s) and/or internal microphone(s). For example, external microphones may be positioned toward/around periphery of the device (e.g., outside surface and/or edge of an ear cup), while internal microphones may be positioned towards an inside of the device (e.g., inside surface and/or center of an ear cup). In some cases, an internal microphone may also be referred to as an error microphone. As discussed further below with respect to FIGS. 3-5, the wireless audio input/output device 104 may be configured to implement an ASR triggering system which processes audio signals provided by the one or more microphone(s) 210. In one or more implementations, the triggering of ASR may further be based on signals provided by other sensor(s) (e.g., an accelerometer).

In one or more implementations, the wireless audio input/output device 104 may provide an audio buffer and a trigger signal indicating that the user wearing the headset detected the key-phrase to the electronic device 102 (e.g., via the RF circuitries 206A-B). In response, the host processor 202A of the electronic device 102 may determine whether to trigger the ASR.

In one or more implementations, one or more of the host processors 202A-B, the memories 204A-B, the RF circuitries 206A-B and/or the specialized processor 212, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
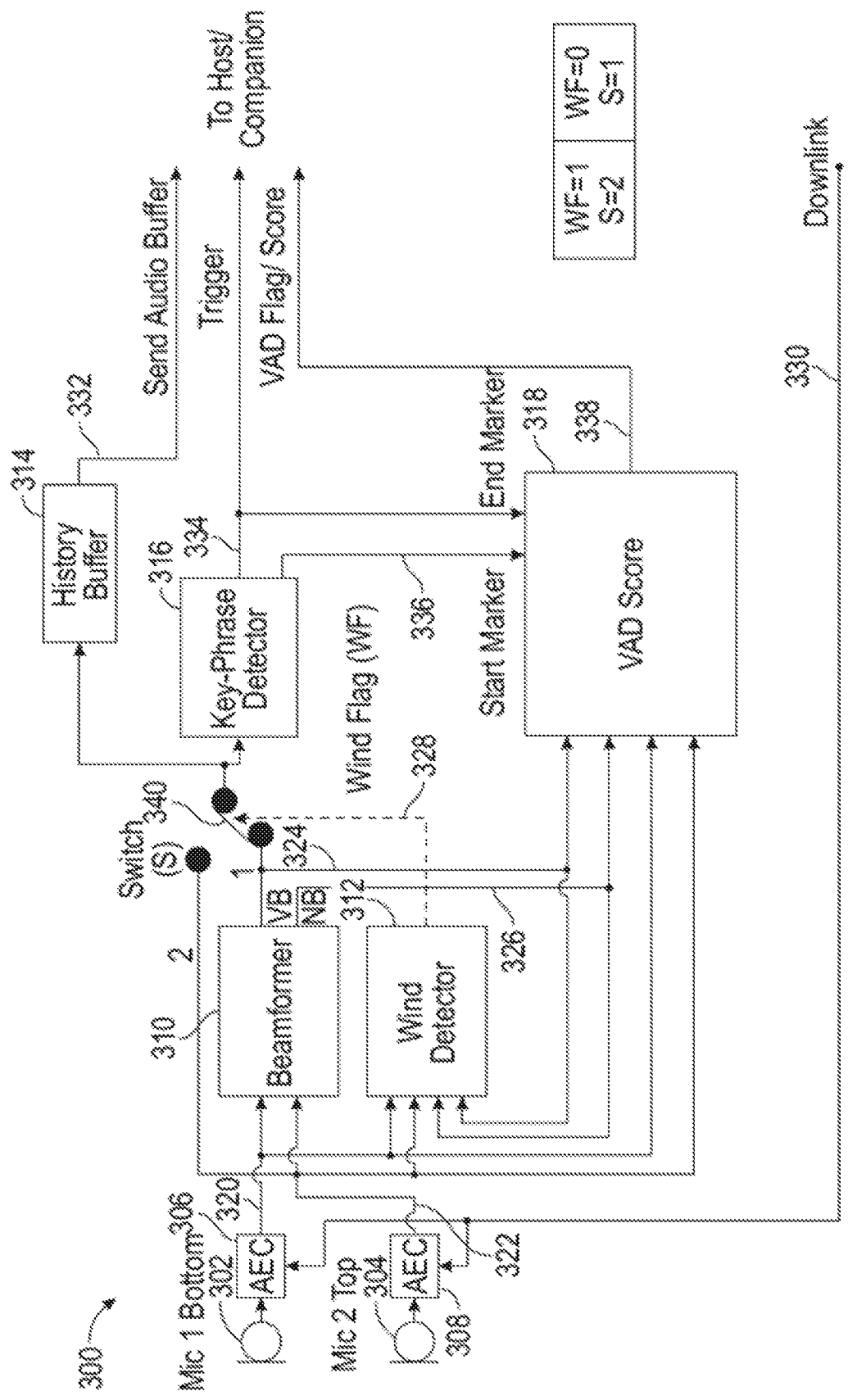
FIG. 3 illustrates an example block diagram of an ASR triggering system that utilizes audio signals received from multiple microphones in accordance with one or more implementations.

FIG. 3 illustrates an example block diagram of an ASR triggering system 300 that utilizes audio signals received from multiple microphones in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the ASR triggering system 300 may be implemented by the wireless audio input/output device 104 (e.g., a set of wireless earbuds) of FIG. 1. However, the ASR triggering system 300 is not limited to the wireless audio input/output device 104 of FIG. 1, and can be implemented by one or more other suitable devices.

The ASR triggering system 300 may provide for (e.g., or partially provide for, in conjunction with the electronic device 102) automatic triggering of an ASR system (e.g., part of a voice assistant) with reduced false triggers (e.g., attributable to one or more of ambient noise, wind noise, and/or a key-phrase spoken by a bystander). The ASR triggering system 300 may include microphones 302-304, acoustic echo cancellers (AECs) 306-308, a beam former 310, a wind detector 312, a history buffer 314, a key-phrase detector 316, a voice activity detector (VAD) score module 318 and a switch 340. In general, the beam former 310 may generate voice beams in a direction of user's mouth, and the wind detector 312 may indicate the presence of wind noise.

When wind noise is not present, the ASR triggering system 300 may switch to an audio signal received from the beam former 310 (e.g., the voice beam in the direction of the user's mouth), for providing to the key-phrase detector 316 and/or the history buffer 314 (e.g., configured to buffer received audio signals). On the other hand, when wind is present, the ASR triggering system 300 may switch (e.g., via the switch 340) to use of audio signals from the microphone 304, which is positioned at a location on the wireless audio input/output device that is shielded from wind noise relative to the microphone 302 (from which the voice beam 324 is at least partially generated).

In the example of FIG. 3, each of microphones 302-304 may produce audio signals which are provided to respective AECs 306-308. In one or more embodiments, each of the AECs 306-308 may be configured to remove echo from the respective microphones 302-304 during modes in which audio downlink (e.g., corresponding to the signal 330) is active. The audio downlink may be active when audio is being output by the wireless audio input/output device 104, such as music, phone calls, and the like. The AECs 306-308 may output respective audio signals 320 and 322, for example, corresponding to one or more sounds (e.g., a user's utterance and/or environmental sound) captured by the microphones 302-304 with any audio downlink having been removed using the signal 330.

As shown in FIG. 3, the audio signals 320 and 322 may be provided as inputs to the beam former 310. Based on these inputs, the beam former 310 is configured to generate a voice beam (VB) 324 in the expected direction of a mouth of a user wearing or otherwise operating the wireless audio input/output device 104. The beam former 310 is further configured to produce a noise beam (NB) 326 in a direction away from the expected direction of the mouth of the user (e.g., an opposite direction with a null towards the user's mouth).

In one or more implementations, the microphone 302 is positioned toward a top portion of the wireless audio input/output device 104, and the microphone 304 is positioned toward a bottom portion of the wireless audio input/output device 104. The microphones 302-304 may be external microphones, where the microphones 303-304 are positioned toward an outside surface/edge of the device 104 (e.g., the microphone 302 may be positioned toward an outside surface/edge of a top portion of an ear cup, and the microphone 304 may be positioned toward an outside surface/edge of a bottom portion of the ear cup). Moreover, one or more of the microphones 302-304 may correspond to an omni-directional microphone.

The wind detector 312 may receive one or more of the audio signals 320-322, the voice beam 324 and/or the noise beam 326 as inputs, in order to determine the presence or absence of wind in the audio signals 320-322. For example, the wind detector 312 may determine one or more of energy level differences (e.g., differences in magnitudes) and/or phase differences with respect to the audio signals 320-322, the voice beam 324 and/or the noise beam 326, in order to detect the presence of wind. In one or more implementations, the wind detector 312 may perform time-domain computations based only on the voice beam 324 and the noise beam 326, thereby reducing the need for frequency-domain transformations associated with additional input audio signals. The output of the wind detector 312 may be a wind flag 328, corresponding to a binary value indicating a likely presence or absence of wind (e.g., based on a predefined value for wind noise) with respect to the audio signals 320-322.

The wind flag 328 may be provided as input to the switch 340, which is configured to select which audio signal will be used for audio buffering (e.g., by the history buffer 314) and/or key-phrase detection (e.g., by the key-phrase detector 316). Thus, if the wind flag 328 indicates the presence of wind (e.g., wind noise exceeding the predefined threshold), the switch 340 provides for selection of the audio signal 322 corresponding to the microphone 304. As noted above, the microphone 304 may be configured for reduced residual echo relative to the microphone 302 (or relative to the voice beam 324) with respect to environmental wind noise. On the other hand, if the wind flag 328 indicates the absence of wind, the switch 340 provides for selection of the voice beam 324 for audio buffering and/or key-phrase detection.

The key-phrase detector 316 may be configured to detect whether the selected audio signal includes a key-phrase (e.g., for triggering ASR for a voice assistant). For example, the key-phrase detector 316 may be configured to perform signal pattern detection on the selected audio signal (e.g., based on energy patterns within different bandwidths of the audio signal). In one or more implementations, the key-phrase detector 316 may detect a start marker and/or an end marker of the key-phrase within the selected audio signal. For example, for the key-phrase "Hi Device," the start marker may correspond with the beginning of the term "Hi" and the end marker may correspond with completion of the term "device." The key-phrase detector may provide the start marker 336 and end marker 334 to the VAD score module 318.

The VAD score module 318 is configured to determine a likelihood that at least one of the audio signals 320-322 corresponds to the user (e.g., who is wearing or otherwise operating the wireless audio input/output device 104). The VAD score module 318 may output a VAD score 338, which may be either a binary value, or a confidence score indicating the likelihood that the key-phrase was spoken by the user. For example, a confidence score meeting or exceeding a threshold may indicate likelihood that the key-phrase was spoken by the user, and a confidence score below the threshold may indicate a likelihood that the key-phrase was not spoken by the user (e.g., was spoken by a bystander).

The VAD score module 318 may be configured to determine the VAD score 338 based on one or more of the audio signals 320-322, the voice beam 324, the noise beam 326, the start marker 336 and/or the end marker 334. In one or more implementations, the VAD score module 318 may calculate a difference in the energy levels (e.g., magnitudes) between the voice beam 324 and the noise beam 326. Thus, the VAD score 338 may be at least partially computed as an average difference in magnitudes for the beams 324-326 across the start marker 336 and the end marker 334.

Alternatively or in addition, the VAD score module 318 may calculate a difference in the energy levels (e.g., magnitudes) between the audio signal 320 and the audio signal 322. For example, the microphone 302 may be located closer to an expected position of the mouth of the user relative to the microphone 304 and therefore the audio signal 320 may be expected to have a greater magnitude than the audio signal 322 when the key-phrase is spoken by the user wearing the wireless audio input/output device 104. Thus, the VAD score 338 may be at least partially computed as an average difference in magnitudes for the audio signals 320-322 across the start marker 336 and the end marker 334. In computing differences in magnitudes between the beams 324-326 and/or differences in magnitudes between the audio signals 320-322, the ASR triggering system 300 may determine a likelihood that the key-phrase was spoken by the user.

The ASR triggering system 300 may further include a history buffer 314, which is configured to buffer audio signals (e.g., on a continuous basis). As noted above, the specialized processor 212 may correspond to an AOP, which may be used to continuously provide audio signals (e.g., as selected based on the switch 340) to the history buffer 314 for audio buffering. With continuous buffering, it is possible to provide an entire phrase duration (e.g., even in cases where the phrase is spoken quickly), thereby reducing or otherwise avoiding loss of audio signals. In one or more implementations, the history buffer 314 may be configured to buffer a key-phrase (e.g., for triggering the ASR) and/or a payload (e.g., corresponding to the user's verbal command to perform one or more operating system/application function(s)).

As shown in FIG. 3, the wireless audio input/output device 104 may provide a host/companion device (e.g., the electronic device 102) with the end marker 334 (e.g., trigger)

detected by the key-phrase detector 316, all or part of the audio buffer 332 stored in the history buffer 314, and the VAD score 338. Based on the VAD score 338 and the end marker (e.g., to trigger ASR for the voice assistant), the electronic device 102 may determine that the audio signal(s) came from the user of the wireless audio input/output device 104, to activate an ASR system for the voice assistant (e.g., to perform an operating system/application function corresponding to words identified by the ASR system).

Alternatively or in addition, the electronic device 102 may perform additional processing based on the trigger (e.g., the end marker 334) and the audio buffer 332, in order to make a determination that the audio signals 320-322 correspond to the user. For example, the electronic device 102 may access a voice profile associated with an account of the user, where the voice profile is stored locally on the electronic device 102, or on the server 108 (e.g., in encrypted form).

In one or more implementations, one or more of the microphones 302-304, the AECs 306-308, the beam former 310, the wind detector 312, the history buffer 314, the key-phrase detector 316, the VAD score module 318 and/or the switch 340, may be implemented in software (e.g., subroutines and code stored in the memory 204B), hardware (e.g., an Application Specific Integrated Circuit (ASIC), the specialized processor 212, a Field Programmable Gate Array (FPGA), a Programmable Logic Device (PLD), a controller, a state machine, gated logic, discrete hardware components, or any other suitable devices), and/or a combination of both.

Figure 4:
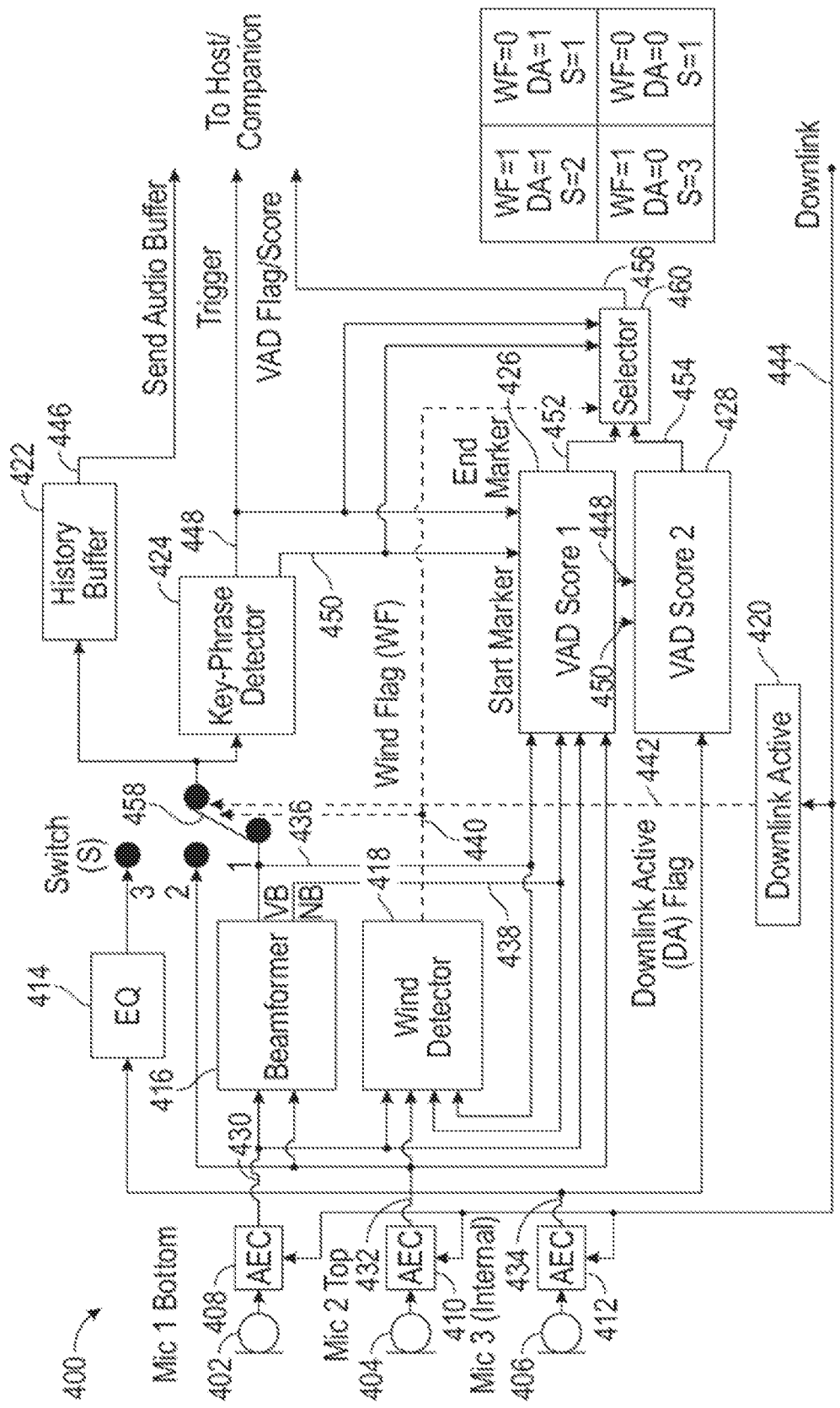
FIG. 4 illustrates a block diagram of an ASR triggering system that utilizes audio signals received from multiple microphones including an internal microphone in accordance with one or more implementations.

FIG. 4 illustrates a block diagram of an ASR triggering system 400 that utilizes audio signals received from multiple microphones including an internal microphone in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the ASR triggering system 400 may be implemented by the wireless audio input/output device 104 (e.g., set of wireless earbuds) of FIG. 1. However, the ASR triggering system 400 is not limited to the wireless audio input/output device 104 of FIG. 1, and can be implemented by one or more other suitable devices.

Similar to the ASR triggering system 300, the ASR triggering system 400 may provide or partially provide for automatic triggering of voice assistants (e.g., an ASR system of a voice assistant) with reduced false triggers (e.g., attributable to one or more of ambient noise, wind noise and/or a key-phrase spoken by a bystander). In one or more implementations, the ASR triggering system 400 may include microphones 402-404, acoustic echo cancellers (AECs) 408-410, a beam former 416, a wind detector 418, a history buffer 422, a key-phrase detector 424, a VAD score module 426 and a switch 458, which may respectively correspond to (e.g., perform similar functionality as) the microphones 302-304, the AECs 306-308, the beam former 310, the wind detector 312, the history buffer 314, the key-phrase detector 316, the VAD score module 318 and the switch 340 of the ASR triggering system 300.

For example, the AECs 408-410 may output audio signals 430-432 which may be provided as input to the beam former 416, which in turn provides a voice beam 436 and a noise beam 438 as output. The wind detector 418 may provide a wind flag 440 indicating the presence or absence of wind. The history buffer 422 may receive an audio signal (e.g., as selected based on the switch 458) and output an audio buffer 446 as input to the electronic device 102 (e.g., a companion device). The key-phrase detector 424 may receive the selected audio signal and provide a start marker 450 and an end marker 448 corresponding to a key-phrase as output to the VAD score module 426.

However, the ASR triggering system 400 may include an additional microphone 406 (e.g., which may be internal, with microphones 302-304 being external), a corresponding AEC 412 (e.g., for removing respective echo), an equalizer (EQ) 414, an additional VAD score module 428, a downlink active module 420 and a selector 460. The downlink active module 420 may provide a downlink active flag 442 indicating whether audio downlink is active.

In one or more implementations, the switch 458 may be configured to change or otherwise select the audio signal 432 corresponding to the microphone 404 in the presence of wind (e.g., based on the wind flag 440) and when the audio downlink is active (e.g., based on the downlink active flag 442). The microphone 404 may be configured for reduced residual echo relative to the microphone 402 (and to the voice beam 436) with respect to wind noise. Moreover, the switch 458 may be configured to change or otherwise select the audio signal 434 corresponding to the microphone 406 (e.g., an internal microphone) in the presence of wind and when the audio downlink is inactive. The audio signal 434 as output by the AEC 412 may be provided as input to the equalizer 414, such that the audio signal 434 is equalized (e.g., to compensate for loss of high frequencies). Otherwise, when no wind is detected, the switch 458 selects the voice beam 436. By switching in this manner, an audio signal may be selected (e.g., via the switch 458) to reduce ambient noise corresponding to wind and/or audio downlink.

The VAD score module 426 may receive one or more of the audio signals 430-432, the voice beam 436, the noise beam 438, the start marker 450 and/or the end marker 448 as input. The VAD score module 426 may calculate and output a VAD score 452 indicating a likelihood that at least one of the audio signals 430-432 corresponds to the user wearing the wireless audio input/output device 104. Similar to FIG. 3 as described above, the VAD score 452 may be based on magnitude differences between the beams 436-438 and/or the audio signals 430-432 as averaged between the start marker 450 and the end marker 448.

In one or more implementations, the VAD score module 428 may receive the audio signal 434, the start marker 450 and the end marker 448 as input. The VAD score module 428 may calculate and output an additional VAD score 454 indicating a likelihood that the audio signal 434 corresponds to the user. The VAD score 454 may be based on whether an average value of the audio signal 434 between the start marker 450 and the end marker 448 meets a predefined value (e.g., a magnitude) indicating a likelihood of the user's voice. In one or more implementations, the VAD score module 428 may further receive a signal (not shown) corresponding to an energy level (e.g., magnitude) from an embedded accelerometer in order to determine the VAD score 454.

The selector 460 may receive the VAD scores 452-454, the start marker 450, the end marker 448 and the wind flag 440, in order to select either the VAD scores 452 or 454 for output 456. As shown in FIG. 4, in the presence of wind, the selector 460 may output the VAD score 454, corresponding to the microphone 406 (e.g., an internal microphone). In one or more implementations, wind flag statistics (e.g., the wind flag values) may be tracked over time with respect to selection of the VAD scores 452-454. For example, the wind flag values may be passed to the electronic device 102, which may be configured to determine whether the audio signals 430-434 correspond to the user, based at least partially on prior and/or current wind flag values.

In one or more implementations, one or more of the microphones 402-406, the AECs 408-412, the beam former 416, the wind detector 418, the history buffer 422, the key-phrase detector 424, the VAD score modules 426-428, the downlink active module 420, the switch 458 and/or the selector 460, may be implemented in software (e.g., subroutines and code executed by the specialized processor 212), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
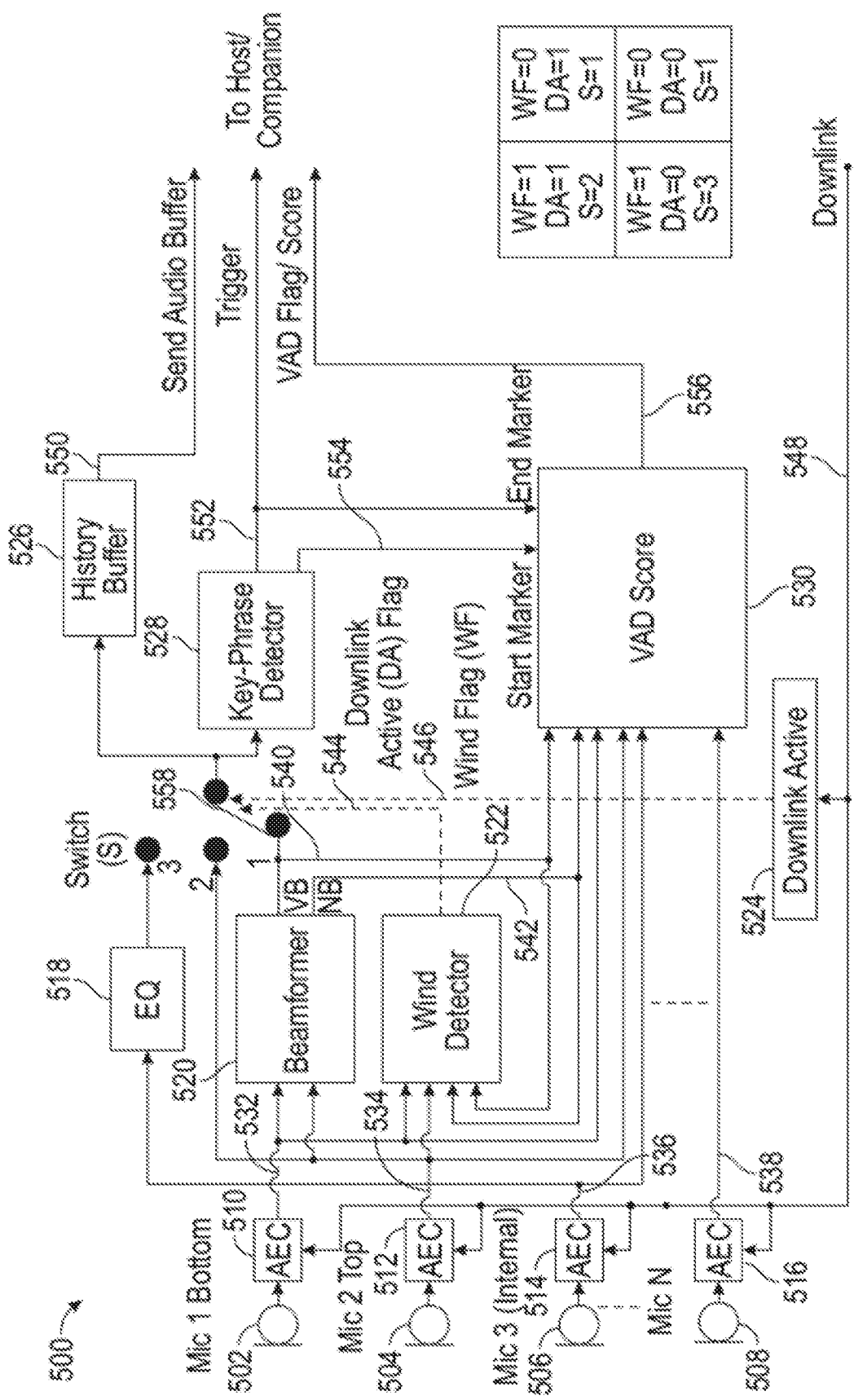
FIG. 5 illustrates a block diagram of an ASR triggering system that utilizes audio signals received from multiple microphones including an internal microphone and two external microphones in accordance with one or more implementations.

FIG. 5 illustrates a block diagram of an ASR triggering system 500 that utilizes audio signals received from multiple microphones including an internal microphone and two external microphones in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the ASR triggering system 500 may be implemented by the wireless audio input/output device 104 of FIG. 1. However, the ASR triggering system 500 is not limited to the wireless audio input/output device 104 of FIG. 1, can be implemented by one or more other suitable devices (e.g., a set of headphones, and/or any suitable in-ear, against the ear, or over the ear device).

Similar to the ASR triggering system 300, the ASR triggering system 500 may provide or partially provide for automatic triggering of voice assistants (e.g., ASR) with reduced false triggers (e.g., attributable to one or more of a key-phrase spoken by a bystander, ambient noise and/or wind). In one or more implementations, the ASR triggering system 500 may include microphones 502-504, acoustic echo cancellers (AECs) 510-512, a beam former 520, a wind detector 522, a history buffer 526, a key-phrase detector 528, a VAD score module 530 and a switch 558, which may respectively correspond to (e.g., perform similar functionality as) the microphones 302-304, the AECs 306-308, the beam former 310, the wind detector 312, the history buffer 314, the key-phrase detector 316, the VAD score module 318 and the switch 350 of the ASR triggering system 300.

For example, the AECs 510-512 may output processed audio signals 532-534 which may be provided as input to the beam former 520, which in turn provides a voice beam 540 and a noise beam 542 as output. The wind detector 522 may provide a wind flag 544 indicating the presence or absence of wind in the audio signals 532-534. The history buffer 526 may receive an audio signal (e.g., as selected based on the switch 558) and output an audio buffer 550 as input to the electronic device 102 (e.g., a companion device). The key-phrase detector 528 may receive the selected audio signal and provide a start marker 554 and an end marker 552 corresponding to a key-phrase as output to the VAD score module 530.

However, the ASR triggering system 500 may include additional microphones 506-508, for example, with microphone 506 being internal, and microphones 502, 504 and 508 being external. As shown in the example of FIG. 5, microphone 508 is depicted as "Mic N," such that the ASR triggering system 500 may include 4 or more microphones. The ASR triggering system 500 further includes AECs 514-516 (e.g., for removing respective echo for the microphones 506-508), an equalizer (EQ) 518, and a downlink active module 524 and a selector 560. The downlink active module 524 may provide a downlink active flag 546 indicating whether audio downlink is active.

In one or more implementations, the switch 558 may be configured to change or otherwise select the audio signal 534 corresponding to the microphone 504 in the presence of wind (e.g., based on the wind flag 544) and when the audio downlink is active (e.g., based on the downlink active flag 546). The microphone 504 may be configured for reduced residual echo relative to the microphone 502 (and to the voice beam 540) with respect to wind noise. Moreover, the switch 558 may be configured to change or otherwise select the audio signal 536 corresponding to the microphone 506 (e.g., an internal microphone) in the presence of wind and when the audio downlink is inactive. The audio signal 536 as output by the AEC 514 may be provided as input to the equalizer 518, such that the audio signal 536 is equalized (e.g., to compensate for loss of high frequencies). Otherwise, when no wind is detected, the switch 558 selects the voice beam 540. By switching in this manner, an audio signal may be selected (e.g., via the switch 558) to reduce ambient noise corresponding to wind and/or audio downlink.

The VAD score module 530 may receive one or more of the audio signals 532-538, the voice beam 540, the noise beam 542, the start marker 554 and the end marker 552 as input. In one or more implementations, the VAD score module 530 may calculate and output a VAD score 556 indicating a likelihood that at least one of the audio signals 532-538 corresponds to the user wearing the wireless audio input/output device 104. For example, computing the VAD score 556 may correspond with determining, based on the magnitudes of the audio signals 532-538 (e.g., corresponding to a sound source which may be the user or another source such as a bystander), which of the microphone(s) 502-508 is/are closest to the sound source (e.g., a mouth of the user).

Figure 6:
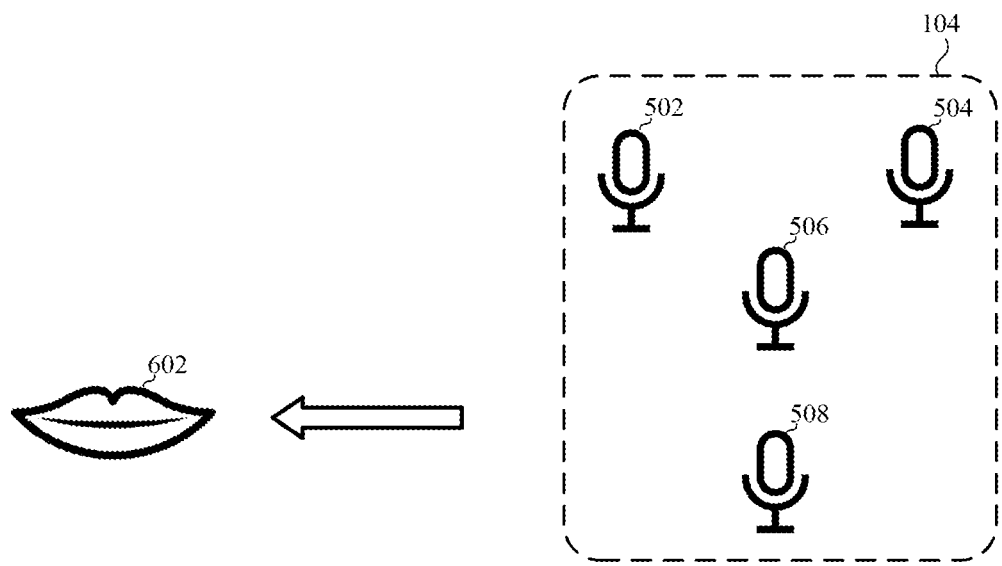
FIG. 6 illustrates an example arrangement of multiple microphones on a wireless audio input/output device relative to a mouth of a user in accordance with one or more implementations.

An example arrangement for positioning the multiple microphones 502-508 relative to a mouth of a user wearing the wireless audio input/output device 104 is illustrated with respect to FIG. 6. Each of the microphones 502-508 may be positioned toward an inside/outside surface of the wireless audio input/output device 104. The surface may be, for example, the inside of an ear cup (the portion of the ear cup facing/touching the user's ear when worn) or the outside of an ear cup (the portion of the ear cup facing away from the user's ear when worn). As noted above, the microphone 506 may correspond to an internal microphone (e.g., positioned toward an inside surface of the ear cup), and the microphones 502, 504 and 508 may correspond to external microphones (e.g., positioned toward on an outside surface of the ear cup). The microphones 502-508 may have different positions relative to the mouth 602 of the user (e.g., wearing the wireless audio input/output device 104), such that the respective audio signals 532-538 have different (e.g., expected) magnitudes with respect to sound (e.g. acoustic waves) propagating from the mouth 602.

In a case where the microphone(s) associated with higher signal magnitudes are positioned closer to the mouth 602 of the user wearing the wireless audio input/output device 104 than the microphone(s) associated with lower signal magnitudes, the VAD score 556 (e.g., a boolean or confidence score) may indicate a higher likelihood that the audio source (e.g., at least one of the audio signals 532-538) corresponds to the user (e.g., the voice of the user). On the other hand, in a case where the microphone(s) associated with higher signal magnitudes are positioned further from the mouth 602 of the user wearing the wireless audio input/output device 104 than the microphone(e) associated with lower signal magnitudes, the VAD score 556 (e.g., a boolean or confidence score) may indicate a lower likelihood that the audio source corresponds to the user.

Referring back to FIG. 5, the VAD score module 530 may be configured to use the microphone levels (e.g., magnitudes) to calculate the VAD score 556 (e.g., as a boolean value) based on the following equation:

$$\text{VAD score} = 1 \text{ if } [(\text{mic506} > \text{Thr1}) \&\&$$
$$(\text{mic506} > \text{Thr2}*\text{mic502}) \&\&$$
$$(\text{mic506} < \text{Thr3}*\text{mic502}) \&\&$$
$$(\text{mic508} > \text{Thr4}*\text{mic502}) \&\&$$
$$(\text{mic502} > \text{Thr5}*\text{mic504}) \quad \text{Equation (1)}$$

In Equation (1), the VAD score may correspond to the VAD score 556, mic502-mic508 may correspond to respective magnitudes of the audio signals 532-538 (e.g., as provided by the microphones 502-508), and Thr1-Thr5 may correspond to threshold values that are predetermined based on the microphone arrangement (e.g., relative positioning, distance, internal or external placement, and the like). Thus, the VAD score 556 may indicate, based on the magnitudes of the audio signals 532-538, that the sound source is the user's mouth 602). The VAD score 556 may be a boolean indicating that the audio signals 532-538 correspond to the user, or may be a confidence score indicating a likelihood that the audio signals 532-538 correspond to the user.

In one or more implementations, one or more of the microphones 502-508, the AECs 510-516, the beam former 520, the wind detector 522, the history buffer 550, the key-phrase detector 528, the VAD score module 530, the downlink active module 5234 and/or the switch 558, may be implemented in software (e.g., subroutines and code executed by the specialized processor 212), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 7:
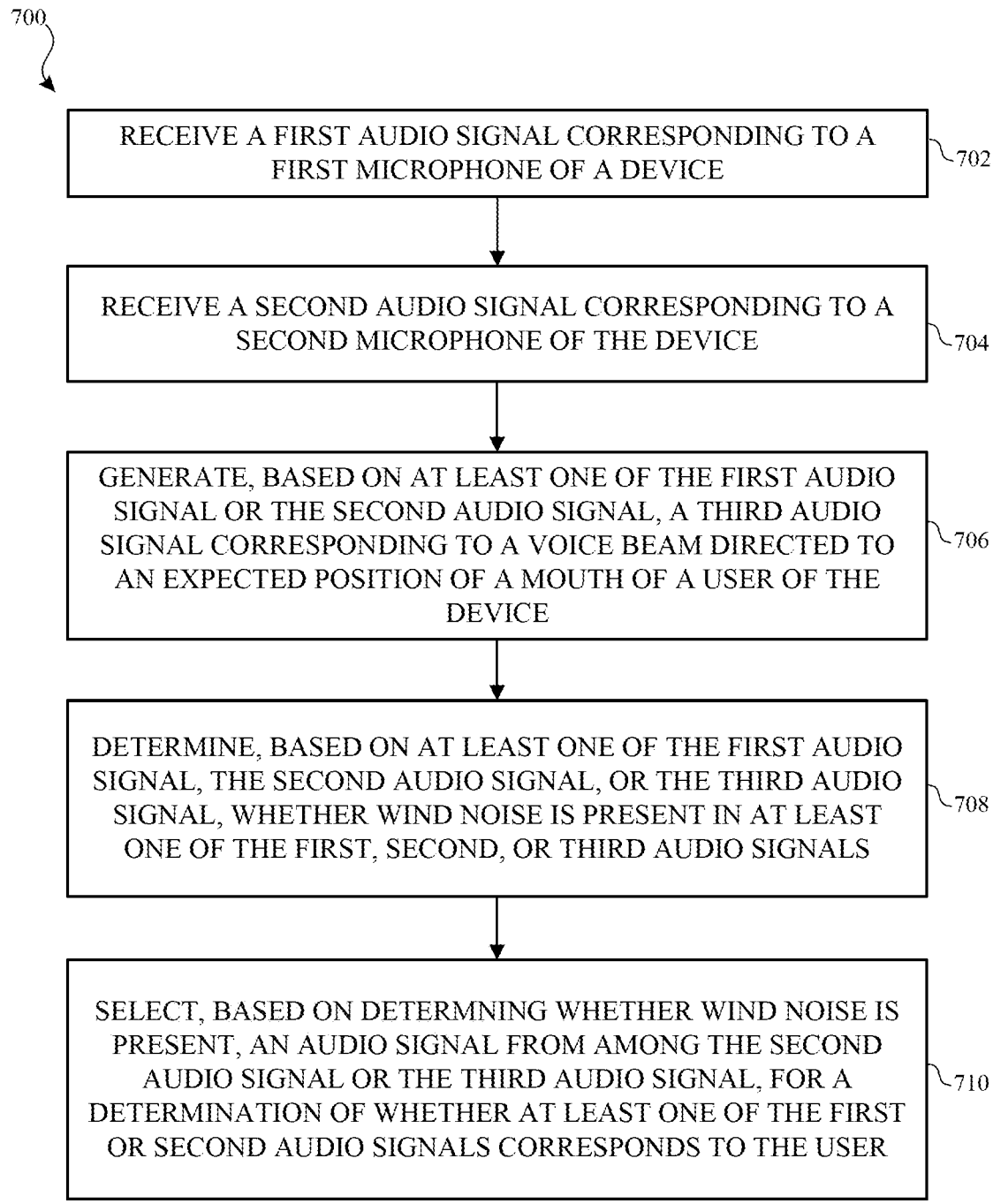
FIG. 7 illustrates a flow diagram of example process for triggering ASR for a set of earbuds in accordance with one or more implementations.

FIG. 7 illustrates a flow diagram of example process 700 for triggering ASR for a set of earbuds in accordance with one or more implementations. For explanatory purposes, the process 700 is primarily described herein with reference to the wireless audio input/output device 104 (e.g., earbuds) of FIG. 1. However, the process 700 is not limited to the wireless audio input/output device 104 of FIG. 1, and one or more blocks (or operations) of the process 700 may be performed by one or more other components and other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The wireless audio input/output device 104 receives a first audio signal corresponding to audio input received at a first microphone of the wireless audio input/output device 104 (702). The wireless audio input/output device 104 receives a second audio signal corresponding to audio input received at a second microphone of the wireless audio input/output device 104 (704). In one or more implementations, the first and second microphones may be external microphones (e.g., on an outside surface and/or edge) of the wireless audio input/output device 104.

The wireless audio input/output device 104 generates based on at least one of the first audio signal or the second audio signal, a third audio signal corresponding to a voice beam directed to an expected position of a mouth of a user of the wireless audio input/output device 104 (706). The wireless audio input/output device 104 may also generate, based on at least one of the first audio signal or the second audio signal, a noise beam directed away from the expected position the mouth of the user.

The wireless audio input/output device 104 determines, based on at least one of the first audio signal, the second audio signal or the third audio signal, a wind parameter indicating a likely presence or absence of wind noise in at least one of the first, second or third audio signals (708) (e.g., based on differences in magnitude and/or phase differences for the audio signals).

The wireless audio input/output device 104 selects, based on the wind parameter, an audio signal from among the second audio signal or the third audio signal, for determination of whether at least one of the first or second audio signals corresponds to the user (710). The second microphone may be configured and/or positioned for reduced residual echo relative to the first microphone with respect to wind noise. The second audio signal may be the selected audio signal when the wind parameter indicates the presence of wind noise in at least one of the first or second audio signals.

The wireless audio input/output device 104 may perform key-phrase detection (e.g., for a predefined phrase to trigger a voice assistant) on the selected audio signal, and calculate a voice activity detection (VAD) score based on the key-phrase detection and at least one of the first, second or third audio signals. The VAD score may indicate a likelihood that the audio signals (e.g., at least one of the first or second audio signals) correspond to the user (e.g., that it was the user wearing or operating the device who uttered the phrase). The wireless audio input/output device 104 may send an indication of the key-phrase detection, the VAD score and/or an audio buffer corresponding to the selected audio signal to the electronic device 102, for further determining whether the at least one of the first. second or third audio signals corresponds to the user.

The wireless audio input/output device 104 may receive, from a third microphone of the wireless audio input/output device 104, a fourth audio signal, the third microphone being an internal microphone. The wireless audio input/output device 104 may determine a downlink parameter indicating active or inactive audio downlink in conjunction with at least one of the first, second third or fourth audio signals. The selecting may include selecting, based on the wind parameter and the downlink parameter, the audio signal from among the second audio signal, the third audio signal or the fourth audio signal, for determination of whether at least one of the first, second, third or fourth audio signals corresponds to the user.

Further, the second microphone may be configured and/or positioned for reduced residual echo relative to the first microphone with respect to wind noise. The second audio signal may be the selected audio signal when the wind parameter indicates the presence of wind noise in at least one of the first, second or third audio signals, and the downlink parameter indicates active audio downlink in conjunction with at least one of the first, second, third or fourth audio signals. In addition, the fourth audio signal may be the selected audio signal when the wind parameter indicates the presence of wind noise in at least one of the first, second or third audio signals, and the downlink parameter indicates inactive audio downlink in conjunction with at least one of the first, second, third or fourth audio signals.

Moreover, the wireless audio input/output device 104 may perform key-phrase detection on the selected audio signal. The wireless audio input/output device 104 may calculate a first voice activity detection (VAD) score based on the key-phrase detection and at least one of the first, second, third and fourth audio signals, and calculate a second VAD score based on the phrase detection and the fifth audio signal. Each of the first VAD score and the second VAD score may indicate a likelihood that the audio signals (e.g., at least one of the first, second, third or fourth audio signals) correspond to the user. The wireless audio input/output device 104 may select a VAD score from among the first VAD score and the second VAD score based at least part on the wind parameter. The wireless audio input/output device 104 may send an indication of the key-phrase detection, the selected VAD score and/or an audio buffer corresponding to the selected audio signal to an electronic device 102, for further determining whether the audio signals (e.g., at least one of the first, second, third or fourth audio signals) correspond to the user.

Figure 8:
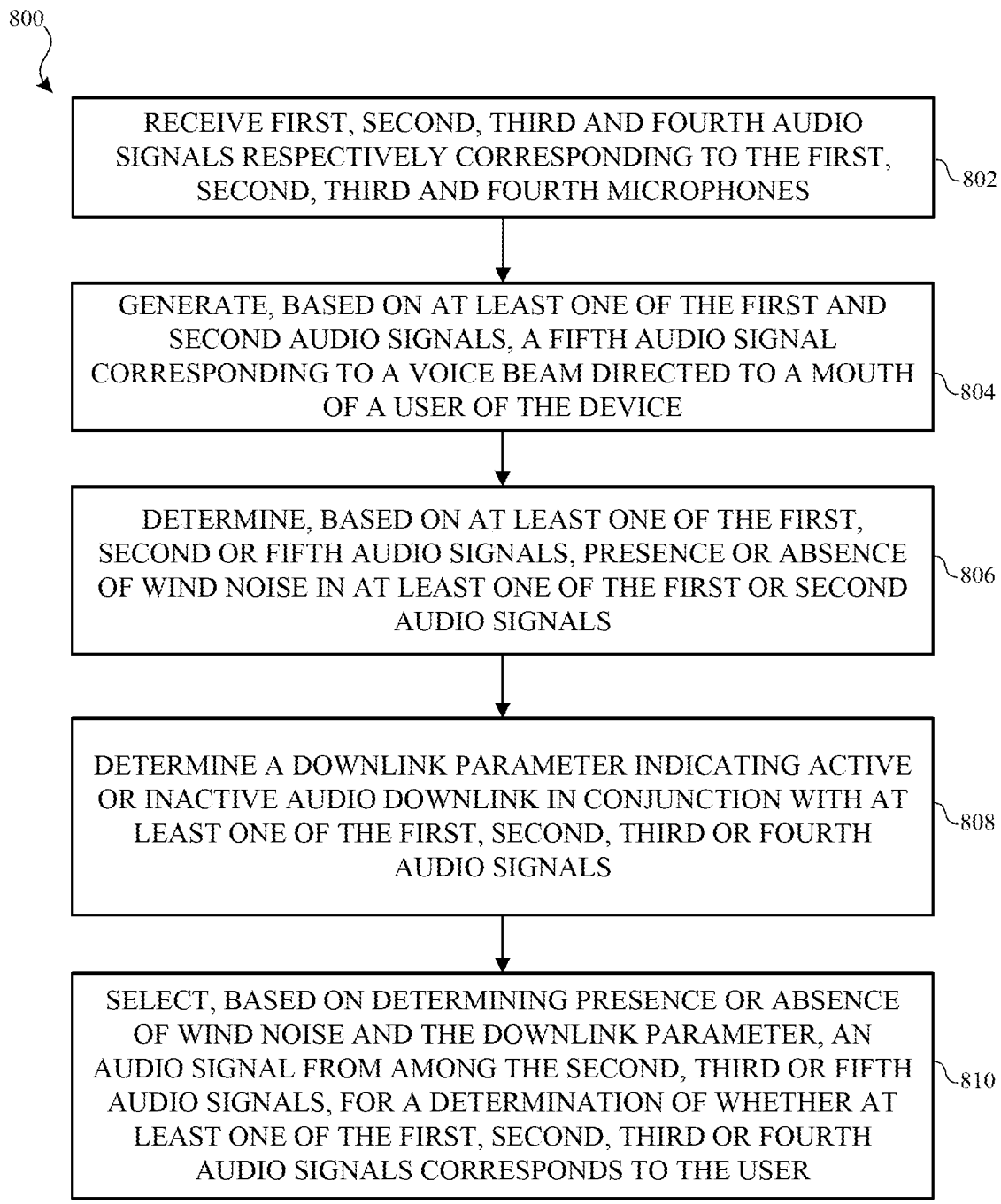
FIG. 8 illustrates a flow diagram of another example process for triggering ASR for a set of headphones in accordance with one or more implementations.

FIG. 8 illustrates a flow diagram of another example process 800 for triggering ASR for a set of headphones in accordance with one or more implementations. For explanatory purposes, the process 800 is primarily described herein with reference to the wireless audio input/output device 104 of FIG. 1. However, the process 800 is not limited to the wireless audio input/output device 104 of FIG. 1, and one or more blocks (or operations) of the process 800 may be performed by one or more other components and other suitable devices (e.g., a set of headphones, and/or any suitable in-ear, against the ear, or over the ear device). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The wireless audio input/output device 104 receives first, second, third and fourth audio signals corresponding to audio input received at respective first, second, third, and fourth microphones of the wireless audio input/output device 104 (802). In one or more implementations, the first, second and fourth microphones may be external microphones (e.g., disposed toward an outside surface of the device 104), and the third microphone may be an internal microphone (e.g., disposed toward an inside surface of the device 104).

The wireless audio input/output device 104 generates, based on at least one of the first and second audio signals, a fifth audio signal corresponding to a voice beam directed to an expected position of a mouth of a user wearing the wireless audio input/output device 104 (804). The wireless audio input/output device 104 may further generate, based on at least one of the first and second audio signals, a noise beam directed away from the expected position of the mouth of the user.

The wireless audio input/output device 104 determines, based on at least one of the first, second or fifth audio signals, a wind parameter indicating presence or absence of wind noise in at least one of the first or second audio signals (806).

The wireless audio input/output device 104 determines a downlink parameter indicating active or inactive audio downlink in conjunction with at least one of the first, second, third or fourth audio signals (808).

The wireless audio input/output device 104 selects, based on the wind parameter and the downlink parameter, an audio signal from among the second, third or fifth audio signals, for determination of whether the audio signals (e.g., at least one of the first, second, third or fourth audio signals) correspond to the user wearing the wireless audio input/output device 104 (810).

The second microphone may be configured and/or positioned for reduced residual echo relative to the first microphone with respect to wind noise. The second audio signal may be the selected audio signal when the wind parameter indicates the presence of wind noise in at least one of the first, second, third, fourth or fifth audio signals, and the downlink parameter indicates active audio downlink in conjunction with at least one of the first, second, third or fourth audio signals.

The third audio signal may be the selected audio signal when the wind parameter indicates the presence of wind noise in at least one of the first, second, third, fourth or fifth audio signals, and the downlink parameter indicates inactive audio downlink in conjunction with at least one of the first, second, third or fourth audio signals.

The wireless audio input/output device 104 may perform key-phrase detection on the selected audio signal, and may calculate a voice activity detection (VAD) score based on the phrase detection and at least one of the first, second, third, fourth or fifth audio signals. The VAD score may indicate a likelihood that the audio signals (e.g., at least one of the first, second, third, fourth or fifth audio signals) correspond to the user. The wireless audio input/output device 104 may send an indication of the key-phrase detection, the VAD score and/or an audio buffer corresponding to the selected audio signal to a second device, for determining whether the audio signals (e.g., at least one of the first, second, third or fourth audio signals) correspond to the user.

As described above, one aspect of the present technology is the gathering and use of data available from specific and legitimate sources for providing user information in association with speech recognition. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing information corresponding to a user in association with speech recognition. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing information corresponding to a user in association with speech recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
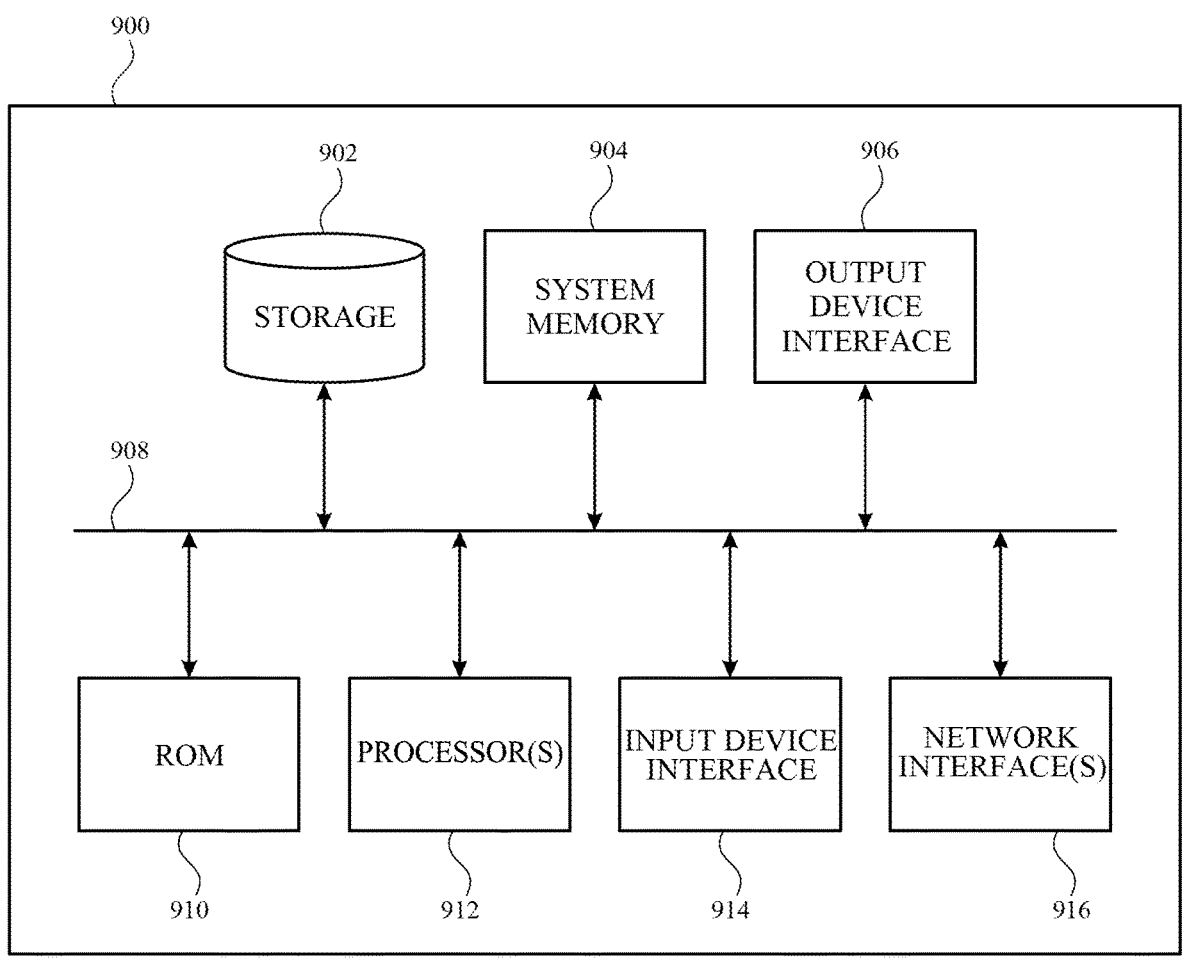
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102, 104, and/or the server 108 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the server 108 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a first audio signal corresponding to a first microphone of a device;
   receiving a second audio signal corresponding to a second microphone of the device;
   generating, based on at least one of the first audio signal or the second audio signal, a third audio signal corresponding to a voice beam directed to an expected position of a mouth of a user of the device;
   determining, based on at least one of the first audio signal, the second audio signal, or the third audio signal, whether wind noise is present in at least one of the first, second, or third audio signals; and
   selecting, based on determining whether wind noise is present, an audio signal from among the second audio signal or the third audio signal, for a determination of whether at least one of the first or second audio signals corresponds to the user.

2. The method of claim 1, wherein the second microphone is configured for reduced residual echo relative to the first microphone with respect to wind noise, and
   wherein the second audio signal is the selected audio signal when wind noise is present in at least one of the first, second, or third audio signals.

3. The method of claim 1, further comprising:
   performing key-phrase detection on the selected audio signal; and
   calculating a voice activity detection (VAD) score based on the key-phrase detection and at least one of the first, second, or third audio signals,
   wherein the VAD score indicates a likelihood that at least one of the first, second, or third audio signals corresponds to the user.

4. The method of claim 3, further comprising:
   sending an indication of the phrase detection, the VAD score and an audio buffer corresponding to the selected audio signal to a second device, for further determining whether the at least one of the first, second, or third audio signals corresponds to the user.

5. The method of claim 1, wherein the first and second microphones are external microphones disposed toward an outside surface of the device.

6. The method of claim 1, further comprising:
   receiving, from a third microphone of the device, a fourth audio signal, the third microphone being an internal microphone.

7. The method of claim 6, further comprising:
   determining a downlink parameter indicating active or inactive audio downlink in conjunction with at least one of the first, second, third, and fourth audio signals,
   wherein the selecting comprises selecting, based on determining whether wind noise is present and the downlink parameter, the audio signal from among the second audio signal, the third audio signal or the fourth audio signal, for determination of whether at least one of the first, second, third, or fourth audio signals corresponds to the user.

8. The method of claim 7, wherein the second microphone is configured for reduced residual echo relative to the first microphone with respect to wind noise, and
   wherein the second audio signal is the selected audio signal when the wind noise is present in at least one of the first, second, or third audio signals, and the downlink parameter indicates active audio downlink in conjunction with at least one of the first, second, third, and fourth audio signals.

9. The method of claim 7, wherein the fourth audio signal is the selected audio signal when the wind noise is present in at least one of the first, second, or third audio signals, and the downlink parameter indicates inactive audio downlink in conjunction with at least one of the first, second, third, and fourth audio signals.

10. The method of claim 6, further comprising:
performing key-phrase detection on the selected audio signal;
calculating a first voice activity detection (VAD) score based on the key-phrase detection and at least one of the first, second, third and fourth audio signals;
calculating a second VAD score based on the key-phrase detection and the fourth audio signal, wherein each of the first VAD score and the second VAD score indicates a likelihood that at least one of the first, second, third or fourth audio signals corresponds to the user; and
selecting a VAD score from among the first VAD score and the second VAD score based at least part on determining whether wind noise is present.

11. The method of claim 10, further comprising:
sending an indication of the key-phrase detection, the selected VAD score and an audio buffer corresponding to the selected audio signal to a second device, for further determining whether at least one of the first, second, third or fourth audio signals corresponds to the user.

12. The method of claim 1, further comprising:
determining, based on at least one of the first audio signal or the second audio signal, a noise beam directed away from the expected position of the mouth of the user.

13. A computer program product comprising code, stored in a non-transitory computer-readable storage medium, the code comprising:
code to receive a first audio signal corresponding to a first microphone of a device;
code to receive a second audio signal corresponding to a second microphone of the device;
code to generate, based on at least one of the first audio signal or the second audio signal, a third audio signal corresponding to a voice beam directed to an expected position of a mouth of a user of the device;
code to determine, based on at least one of the first audio signal, the second audio signal, or the third audio signal, whether wind noise is present in at least one of the first, second, or third audio signals; and
code to select, based on determining whether wind noise is present, an audio signal from among the second audio signal or the third audio signal, for a determination of whether at least one of the first or second audio signals corresponds to the user.

14. The computer program product of claim 13, wherein the second microphone is configured for reduced residual echo relative to the first microphone with respect to wind noise, and
wherein the second audio signal is the selected audio signal when wind noise is present in at least one of the first, second, or third audio signals.

15. The computer program product of claim 13, the code further comprising:

code to perform key-phrase detection on the selected audio signal; and
code to calculate a voice activity detection (VAD) score based on the key-phrase detection and at least one of the first, second, or third audio signals,
wherein the VAD score indicates a likelihood that at least one of the first, second, or third audio signals corresponds to the user.

16. A device, comprising:
first, second, third and fourth microphones;
at least one processor; and
a memory including instructions that, when executed by the at least one processor, cause the at least one processor to:
receive first, second, third and fourth audio signals respectively corresponding to the first, second, third and fourth microphones;
generate, based on at least one of the first and second audio signals, a fifth audio signal corresponding to a voice beam directed to a mouth of a user of the device;
determine, based on at least one of the first, second or fifth audio signals, presence or absence of wind noise in at least one of the first or second audio signals;
determine a downlink parameter indicating active or inactive audio downlink in conjunction with at least one of the first, second, third or fourth audio signals; and
select, based on determining presence or absence of wind noise and the downlink parameter, an audio signal from among the second, third or fifth audio signals, for a determination of whether at least one of the first, second, third or fourth audio signals corresponds to the user.

17. The device of claim 16, wherein the first, second and fourth microphones are external microphones disposed toward an outside surface of the device, and
wherein the third microphone is an internal microphone disposed toward an inside surface of the device.

18. The device of claim 16, wherein the second microphone is configured for reduced residual echo relative to the first microphone with respect to wind noise, and
wherein the second audio signal is the selected audio signal when wind noise is present in at least one of the first, second, third, fourth or fifth audio signals, and the downlink parameter indicates active audio downlink in conjunction with at least one of the first, second, third or fourth audio signals.

19. The device of claim 16, wherein the third audio signal is the selected audio signal when wind noise is present in at least one of the first, second, third, fourth or fifth audio signals, and the downlink parameter indicates inactive audio downlink in conjunction with at least one of the first, second, third or fourth audio signals.

20. The device of claim 16, the instructions further causing the at least one processor to:
perform key-phrase detection on the selected audio signal; and
calculate a voice activity detection (VAD) score based on the key-phrase detection and at least one of the first, second, third, fourth or fifth audio signals,
wherein the VAD score indicates a likelihood that at least one of the first, second, third fourth or fifth audio signals corresponds to the user.

* * * * *